Figures 1, 2, 3:
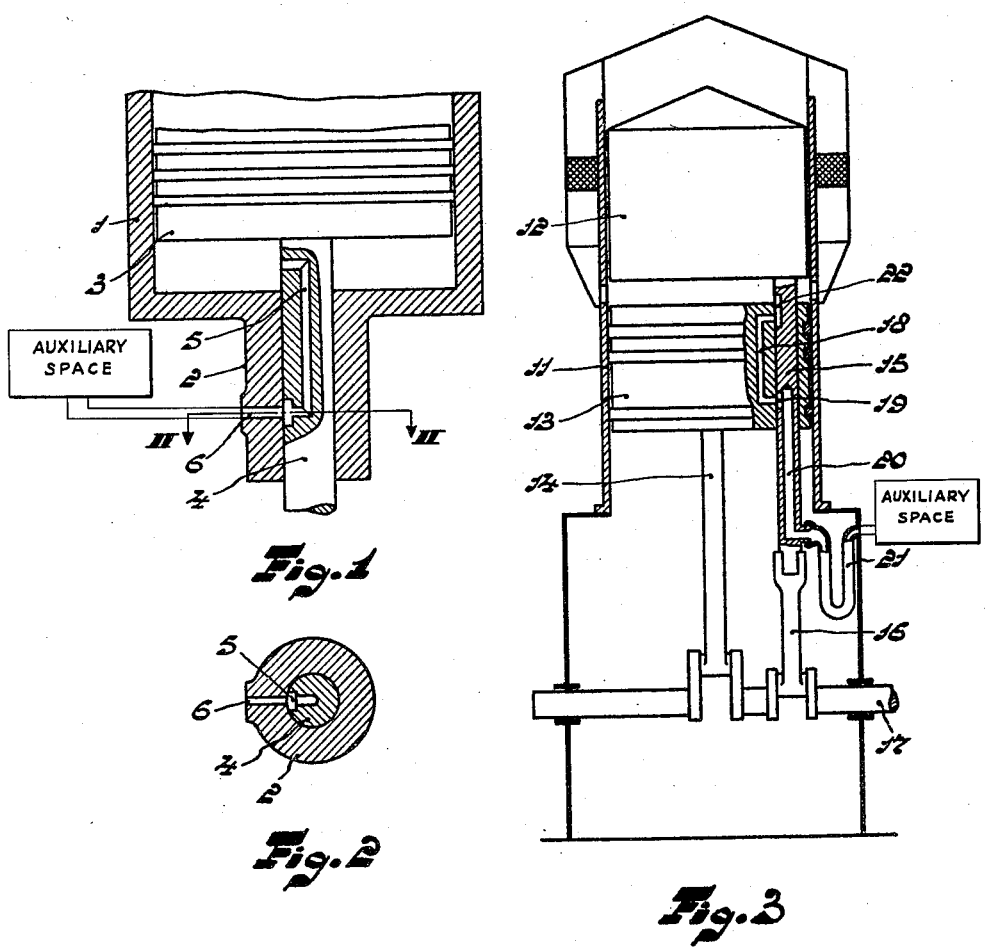

INVENTORS
Heinrich de Brey and
Franciscus Lambertus van Weenen
AGENT

Patented Sept. 23, 1952

2,611,237

UNITED STATES PATENT OFFICE 2,611,237

HOT GAS RECIPROCATING ENGINE COMPRISING A DEVICE FOR VARYING THE AMOUNT OF WORKING MEDIUM IN SUCH ENGINES

Heinrich de Brey and Franciscus Lambertus van Weenen, Eindhoven, Netherlands, assignors to Hartford National Bank and Trust Company, Hartford, Conn., as trustee Application November 16, 1949, Serial No. 127,576
In the Netherlands December 4, 1948

5 Claims. (Cl. 60—24)

This invention relates to closed cycle hot-gas reciprocating engines comprising a device for varying the power output by variation of the amount of working medium in such engines. The term hot-gas engine is to be understood to include a refrigerating apparatus operating according to the reversed hot-gas engine principle.

According to the invention, a closed cycle hot-gas reciprocating engine comprising a device for varying the power output by variation of the amount of working medium taking part in the thermodynamic cycle in this engine, is characterized in that one of the parts of one or more of the members reciprocating in the engine is provided with a duct which permits a periodic communication between the working space of the hot-gas reciprocating engine and a second space containing working medium.

In known devices for varying the amount of working medium in hot-gas reciprocating engines the working medium is supplied or withdrawn either through an aperture in the cylinder which is adapted to be opened or closed by the piston or displacer, or with the use of a valve. The first-mentioned device suffers from the disadvantage that the medium may be supplied or withdrawn only at substantially the lowest pressure in the cycle. However, since in certain cases, for example for traction engines and engines driving generators, it may be important to supply the medium at a pressure other than this substantially lowest pressure, this device is not particularly suitable for such engines. Furthermore, the device comprising a valve has the disadvantage that, as a rule, a comparatively complicated mechanism is required for opening and closing the valve.

With the use of the present invention it is possible to vary the amount of working medium in hot-gas reciprocating engines in a simple manner, it being possible by a suitable construction of the device, to supply or withdraw working medium at any predetermined point of a cycle. A periodic communication between the working space of a hot-gas reciprocating engine and the second space containing working medium may be established by means of at least one rod, of the members reciprocating in the engine, comprising a duct.

According to one embodiment of the invention, a duct in the piston rod permits a periodic communication between the working space and the second space, the communication between the working space in the engine and the second space through the duct provided in the piston rod being periodically opened and closed by means of a piston rod guide.

In a further embodiment of the invention, in which the hot-gas engine comprises a piston and a displacer, a displacer rod is provided with a bore permitting a periodic communication between the working space in the engine and the second space, by way of the bore in the displacer rod, the guide for the rod in the working piston periodically opening or closing this communication.

More particularly in engines in which rapid control is of utmost importance, for example in traction engines and engines driving a generator, it is advantageous if the position of the duct in the piston rod with respect to the stroke of the engine and to the piston rod guide is such that the periodic communication between the two spaces is established at substantially the highest pressure of the cycle.

This control at maximum pressure affords, in adddition to the advantage of more rapid control, the possibility of stopping the engine when the highest pressure of the medium in the engine during a cycle is equal to the atmospheric pressure, since in this case the power output is small with respect to the frictional and other losses. Furthermore, the control range is larger than in the case of control at, for example, the lowest pressure, since the control may be effected between the highest permissible maximum pressure, for example 30 atms., and the lowest possible maximum pressure, for example 1 atm.

In the case of control at minimum pressure, this control takes place between the highest permissible minimum pressure, for example 12 atms., and the lowest possible minimum pressure, for example 1 atm. A further advantage is that the engine may be started by the same means as those used for the control.

The invention will now be explained more fully by reference to the accompanying diagrammatic drawing, showing, by way of example, two embodiments of a hot-gas reciprocating engine according thereto, in which Fig. 1 shows an embodiment in which the working space is caused to communicate with an auxiliary space by way of a piston rod guide.

Fig. 2 is a sectional view of the engine shown in Fig. 1 taken on the line II—II, and Fig. 3 shows a second embodiment in which the working space is caused to communicate with an auxiliary space by way of the guide for the displacer rod in the piston.

Referring now to Fig. 1, a hot-gas reciprocating engine comprises a cylinder 1 having a piston rod guide 2. A piston 3 and a piston rod 4 are adapted to reciprocate in the cylinder 1 and the piston rod guide 2, respectively. The piston rod 4 is provided with a duct 5 which may communicate with a duct 6 provided in the piston rod guide 2, the duct 6 communicating with an auxiliary space which is schematically shown in Fig. 1.

The operation of the device is as follows. The working space may be caused to communicate with the auxiliary space through the ducts 5 and 6. The moment at which such communication is established, is dependent on the length of the duct 5 and on the position of duct 6. If a pressure difference prevails between the working space and the auxiliary space, this pressure difference is neutralised by the periodic communication between the two said spaces, which permits of varying the mean pressure of the cycle taking place in the engine.

In Fig. 3, a displacer 12 and a piston 13 are movable in a cylinder 11. A piston rod 14 and displacer rods 15 and 16 co-operate with a crank shaft 17.

The piston 13 is provided with a duct 18 which, at a determined position of piston and displacer, may be caused to communicate with a bore 20 in the displacer rod 15 by way of an aperture 19. The bore 20 is connected to a flexible tube 21. The displacer rod 19 is furthermore provided with a duct 22 such that, at a predetermined position, the working space may be caused to communicate by way of the duct 22, the duct 18, the aperture 19, the bore 20 and the flexible tube 21 with an auxiliary space containing working medium, which space is schematically shown.

In this position there may be exchange of medium between the working space and the auxiliary space, which permits of varying the power supplied by the engine or the cooling effect of the refrigerator.

It is evident that different positions of the duct 22 and of the aperture 19 permit of varying the point of the cycle at which the medium is exchanged. The pressure in the auxiliary space may be varied in known manner. Furthermore, it is possible to connect the tube to spaces of mutually different pressures, for example with the use of a distribution cock.

What we claim is:

1. A closed cycle hot gas engine comprising a cylinder, reciprocating means therein, a power medium contained in the working space of said cylinder, means to vary the power output of said engine by varying the amount of the working medium within said cylinder, said latter means comprising a second space containing working medium at controlled pressures, duct means in said reciprocating means which periodically connects said working space with said second space.

2. A closed cycle hot gas engine comprising a cylinder, reciprocating means therein, connecting rod means connected to said reciprocating means, a power medium contained in the working space of said cylinder, means to vary the power output of said engine by varying the amount of the working medium within said cylinder, said last means comprising a second space containing working medium at controlled pressures, duct means in said connecting rod means which periodically connects said working space with said second space.

3. A closed cycle hot gas engine comprising a cylinder, reciprocating means therein, a crankshaft, connecting rod means connecting said reciprocating means to said crankshaft, guide means for said connecting rod means, a power medium contained in the working space of said cylinder, means to vary the power output of said engine by varying the amount of the working medium within said cylinder, said last means comprising a second space containing working medium at controlled pressures, first duct means in said guide means communicating with said second space, second duct means in said connecting rod means which communicate with said working space and said first duct means, said second duct means being of a predetermined length to establish communication with said first duct means at the end of the compression stroke.

4. A closed cycle hot gas engine comprising a cylinder, reciprocating means therein, a crankshaft, a connecting rod connecting said reciprocating means to said crankshaft, a connecting rod guide means, a power medium contained in the working space of said cylinder, means to vary the power output of said engine by varying the amount of the working medium within said cylinder, said last means comprising a second space containing working medium at controlled pressures, first duct means in said rod guide means in communication with said second space, second duct means in said connecting rod communicating at one end with said working space and at the other end communicating periodically with said first duct means.

5. A closed cycle hot gas engine comprising a cylinder, a working piston therein, a displacer located therein, a crankshaft, a displacer connecting rod extending through said working piston to connect said displacer to said crankshaft, a power medium contained in the working space of said cylinder, means to vary the power output of said engine by varying the amount of the working medium within said cylinder, said means comprising a second space containing working medium at controlled pressures, said displacer connecting rod having bore means communicating with both said working space and said second space, and means in said piston for periodically opening and closing said bore means.

HEINRICH DE BREY.
FRANCISCUS LAMBERTUS VAN WEENEN.

REFERENCES CITED

The following references are of record in the file of this patent:

FOREIGN PATENTS

| Number | Country | Date |
|---|---|---|
| 604,214 | France | Jan. 22, 1926 |
| 920,056 | France | Dec. 16, 1946 |